AIRSHIP

Original Filed Dec. 4, 1967 4 Sheets-Sheet 1

INVENTORS
JOHN R. FITZPATRICK &
JUERGEN K. BOCK
BY
Busser, Smith & Harding
ATTORNEYS

AIRSHIP

Original Filed Dec. 4, 1967 4 Sheets-Sheet 2

INVENTORS
JOHN R. FITZPATRICK &
JUERGEN K. BOCK
BY
Busser, Smith + Harding
ATTORNEYS

AIRSHIP

Original Filed Dec. 4, 1967 4 Sheets-Sheet 3

INVENTORS
JOHN R. FITZPATRICK &
JUERGEN K. BOCK
BY
Busser, Smith + Harding
ATTORNEYS INVENTORS
JOHN R. FITZPATRICK &
JUERGEN K. BOCK
BY
Busser, Smith + Harding
ATTORNEYS

United States Patent

Re. 28,454
Reissued June 17, 1975

28,454
AIRSHIP

John R. Fitzpatrick, Levittown, Pa., and Juergen K. Bock, Delmenhorst, Germany, assignors to Aereon Corporation, Trenton, N.J.

Original No. 3,486,719, dated Dec. 30, 1969, Ser. No. 687,845, Dec. 4 1967. Application for reissue Dec. 23, 1971 Ser. No. 211,595

Int. Cl. B64b *1/20, 1/30*

U.S. Cl. 244—25 8 Claims

Matter enclosed in heavy brackets [ ] appears in the original patent but forms no part of this reissue specification; matter printed in italics indicates the additions made by reissue.

ABSTRACT OF THE DISCLOSURE

A cargo-carrying airship comprises a gas-filled, low aspect ratio deltoid wing. Internally, and lengthwise along the underside of the ship, there is provided a cargo space sealed from the gas space, and provided with a pair of parallel track assemblies along the ceiling of the cargo space, on which ride movable cargo hoists. The ceiling of the cargo space is suspended by cables from suspension points within the gas space, and the suspension points are, in turn, suspended by cables from the upper shell of the hull. Adjustable landing gear, mounted from the suspension points, permit variation of the ship's angle of attack on the group, and a rear propulsion system acting against a convex stern arch effectively compensates for drag. The ship, when filled with helium and unloaded, has a dead weight of the order of the weight of the volume of air displaced by the ship.

Background of the invention

This invention relates to airships, and particularly to a powered, gas-filled airship suitable for carrying large quantities of cargo, which takes advantage of both the lift provided by a lighter-than-air gas and aerodynamic lift.

Various attempts have been made to supplement aerodynamic and aerostatic lift by each other. It is known, for example, that both rigid and non-rigid gas-filled airships which are normally lighter-than-air, are capable of taking off even though overloaded to the point that they are, in fact, heavier-than-air. Such airships, however, have been generally in the form of prolate ellipsoids, and the aerodynamic lift imparted to such airships is minimal when compared with a conventional airfoil with the same planform area.

Because the lift in conventional airships is primarily aerostatic, their cargo-carrying capability is limited by the available gas envelope, and the total lift at best, corresponds to little more than the weight of the air displaced by the gas envelope. In conventional airships, furthermore, in which cargo is carried, the problem of dispersing concentrated loads is encountered. The difficulties involved in loading cargo into conventional airships give rise to comparatively uneconomical operation because they result in relatively long turn-around times, or periods during which the airship must remain at its terminal.

Airships have had their propulsion systems arranged along their sides or underneath their bodies. These arrangements produce an upward pitching moment and generally do not give rise to an efficient control of the boundary layer, which is responsible for aerodynamic drag.

Lighter-than-air airships, furthermore, are incapable of taxiing on their landing fields, and take-off and landing procedures are consequently very complex, requiring costly equipment and large number of men in ground crews. On the other hand, conventional cargo airplanes, while they are capable of taxiing, have very high and relatively unsafe take-off and landing speeds.

Summary of the invention

In accordance with the invention, a vehicle is provided, the body of which is in the form of a delta wing having a low aspect ratio, and which is inflated with helium. A cargo and fuel compartment is provided inside the hull, and is suspended by numerous high-strength steel cables, which distribute the concentrated load of the cargo compartment over the large area of the upper shell of the body. The propulsion system is arranged on the rear of the body so that the drag and propulsion systems are effectively in tandem so that the momentum loss of the flow due to the deceleration of the drag system is compensated by the accelerating action of the propulsion system, thus restoring the original velocity of the fluid. By the use of the stern propulsion system, a large power saving is realized.

Because of its excess gross weight, and because it is provided with landing gear, the vehicle in accordance with this invention is capable of taxiing on the ground in the same manner as a conventional multi-engine airplane. The vehicle is provided with a taxi control station in its stern so that downward taxiing and 180° turns can be avoided by taxiing the ship in reverse.

The landing gear are adjustable so that the ship can maintain a nose-down attitude while it is on the ground. The nose can be raised for take-off. When the nose of the ship is raised for take-off, the initial angle of attack of the ship permits the buildup of an effective air cushion during the take-off run, which relieves the load from the wheels, and reduces the rolling friction. The ground effect also cushions the touch-down during landing. The ship has relatively low take-off and landing speeds. The landing gear are permitted to swivel freely about vertical axes so that the wheel units act as a cross-wind landing gear, which permit take-off and landing without aligning the ship with the runway.

The principal object of the invention is to provide an airship which has a high cargo carrying capacity, and which is capable of being loaded and unloaded quickly in order to provide efficient and economical operation.

A further object is to provide an airship which is highly efficient and maneuverable both in the air and on the ground as a result of its being operated heavier-than-air.

Still further objects will be apparent from the following description read in conjunction with the accompanying drawings.

Description of the preferred embodiment

Figure 1:
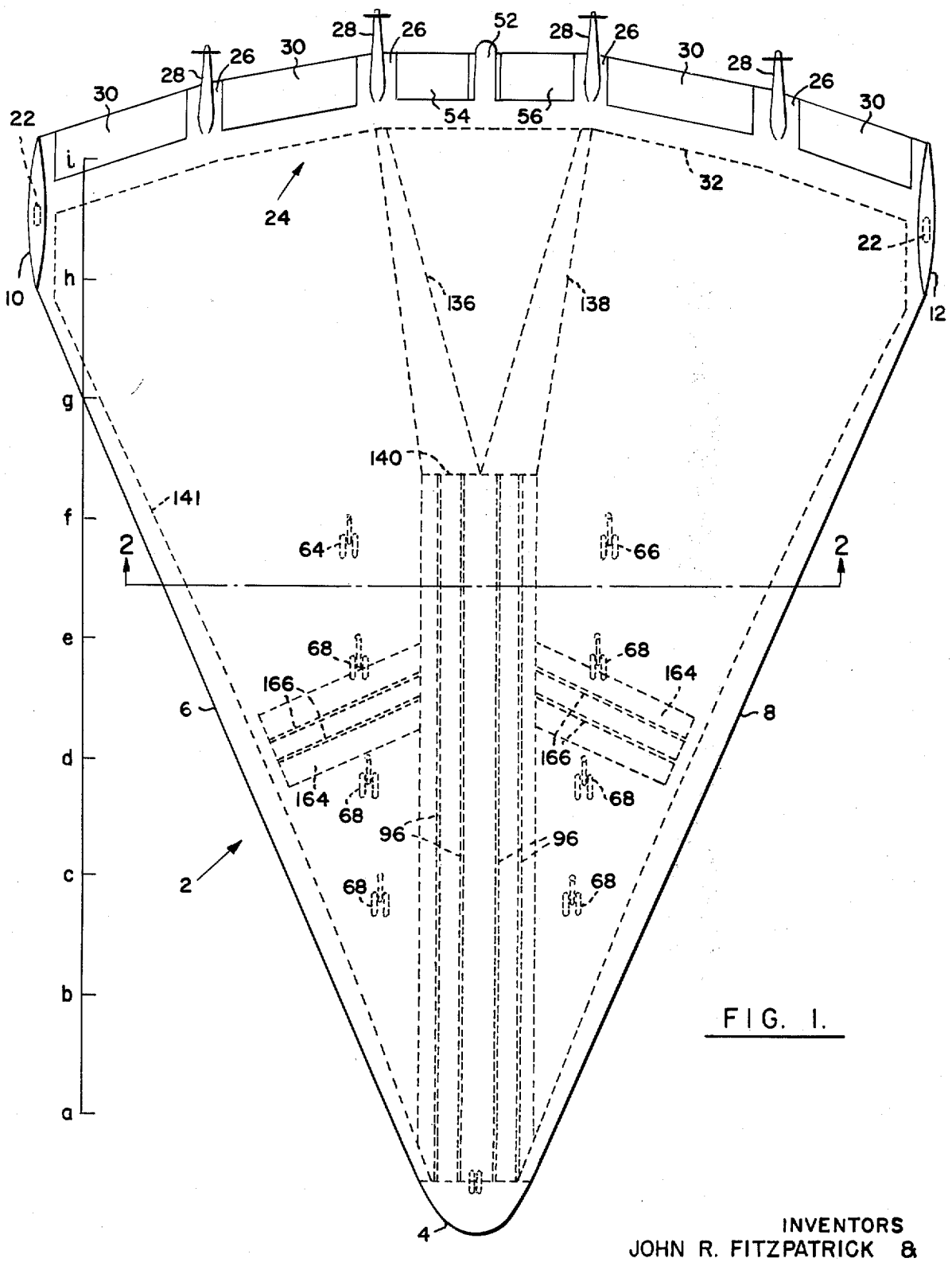
FIGURE 1 is a plan view of an airship in accordance with the invention.

Referring to FIGURE 1, hull 2 is shown comprising a nose section 4, at which a pair of leading edges 6 and 8 meet. The rearward 64% of the chord length of each leading edge is substantially conical, while the forward 36% of the chord length of each leading edge comprises a compund curvature which effects a transition to the nose section. End plates 10 and 12 are provided at the rear of each leading edge, and are shown in greater detail in FIGURE 4, as comprising fixed stabilizing surfaces 14 and 16, which are provided in a slightly toe-in position for yaw stability. Control surfaces 18 act as rudders, and trim tabs are provided at 20. Wheels, which act as part of the landing gear are provided at 22.

Returning to FIGURE 1, a stern arch generally indicated at 24 is polygonal in shape, and an engine mount 26 is provided at each corner. An engine nacelle 28, containing a turbo-prop engine, is provided on each mount 26.

Figure 7:
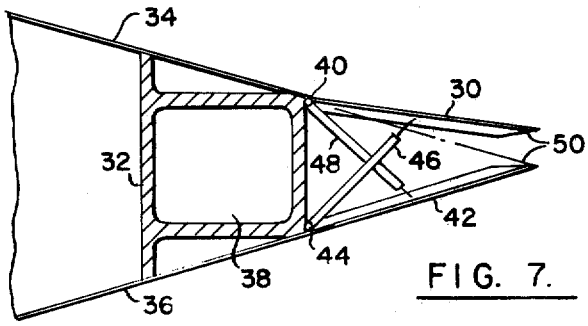
FIGURE 7 is a vertical section of the stern of the airship, showing the split-flap system and an access corridor.

Spoiler flap assemblies including upper spoiler flaps 30 are provided along the stern, and are shown in greater detail in FIGURE 7. A gas bulkhead 32 is provided between upper and lower hull shells 34 and 36, and an access corridor 38 is provided along the exterior of gas bulkhead 32. Upper spoiler flap 30 is hinged at 40, and a similar lower spoiler flap 42 is hinged at 44. The upper spoiler flap 30 is controlled by a hydraulic actuator 46, and the lower spoiler flap 42 is controlled by a similar hydraulic actuator 48. Upper flap 30 is shown in a slightly raised position, but it will be apparent that, since the spoiler flaps are beveled at 50, they are capable of meeting to form a comparatively sharp edge.

Returning again to FIGURE 1, in order to facilitate rearward taxiing, a taxiing control station 52 is provided at the center of the stern, and access to its interior is had through corridor 38. Spoiler flaps 54 and 56 are provided on either side of control station 52, and, except for their smaller width, they are similar to spoiler flaps 30, and are controlled similarly. Flaps 54 and 56 are associated with lower spoiler flaps (not shown).

Figure 2:
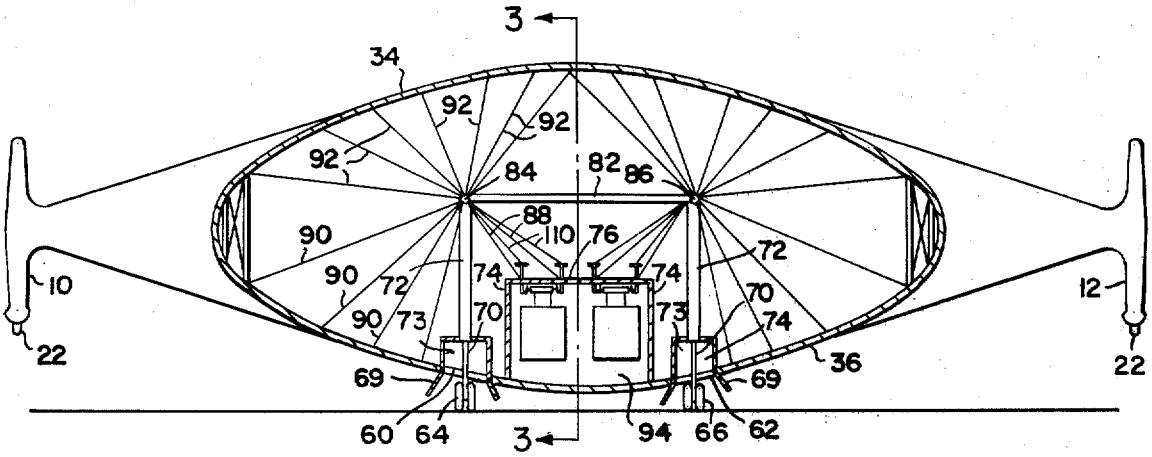
FIGURE 2 is a section taken on the plane indicated at 2—2 in FIGURE 1.

Reference will now be made to FIGURE 2, which shows the lower half 36 of the shell of the airship provided with openings 60 and 62, through which may pass retractable landing wheels 64 and 66. A plurality of such openings is provided, one for each of the additional landing wheel assemblies 68, shown in FIGURE 1. These openings may be closed in flight by doors 69. Each landing wheel assembly is supported by a mast, including a hydraulically actuable piston 70, which extends into a hydraulic cylinder 72. Landing wheel compartments are provided for each set of wheels at 73, and the upper partition of each compartment 73 is provided with a seal (not illustrated) around the mast cylinder to prevent the escape of gas. Each wheel assembly is permitted to swivel freely about a vertical axis and, as will be apparent, this arrangement facilitates cross-wind landing, since it permits the ship to be landed without its axis being aligned with the runway. A conventional pumping system (not illustrated) may be provided in order to introduce a hydraulic fluid selectively into the various cylinders 72 in order to produce retraction and extension of the landing gear to desired vertical position relative to the ship, and also to adjust the attitude of the ship while it is on the ground.

A housing, enclosing the cargo compartment, includes vertical gas-tight walls 74 and a horizontal gas-tight cover 76.

A rigid, horizontal compression beam 82 is provided between the upper ends of aligned hydraulic cylinders 72 to connect suspension points 84 and 86. A plurality of cables 88 supports the cover of the cargo compartment from suspension point 84, and the lower half shell of the body is suspended from point 84 by cables 90. Cables 92 are connected between suspension points 84 and various points on the upper half shell 34. Similar cables radiate from suspension point 86, and from the suspension point at the upper ends of the remaining hydraulic cylinders 72.

Figure 8:
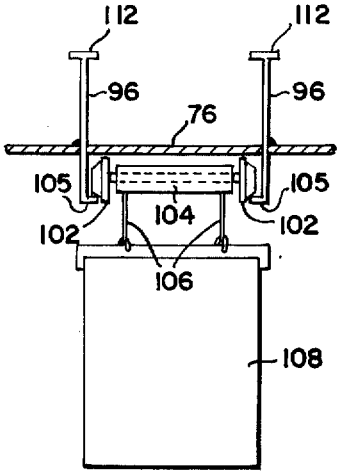
FIGURE 8 is a front elevation of a cargo hoist.

Referring to FIGURES 2 and 8, a cargo compartment 94 is provided with rails 96 extending through and attached to cover 76, and running lengthwise of the ship. Wheels 102 of a hoist indicated at 104 ride on lower edges 105 of the rails. Cables 106 are arranged to be pulled by the hoist, and connect to a cargo container 108, which may be, for example, a large trailer.

Cables 110 connect the upper ends 112 of the rails to the suspension points.

Figure 3:
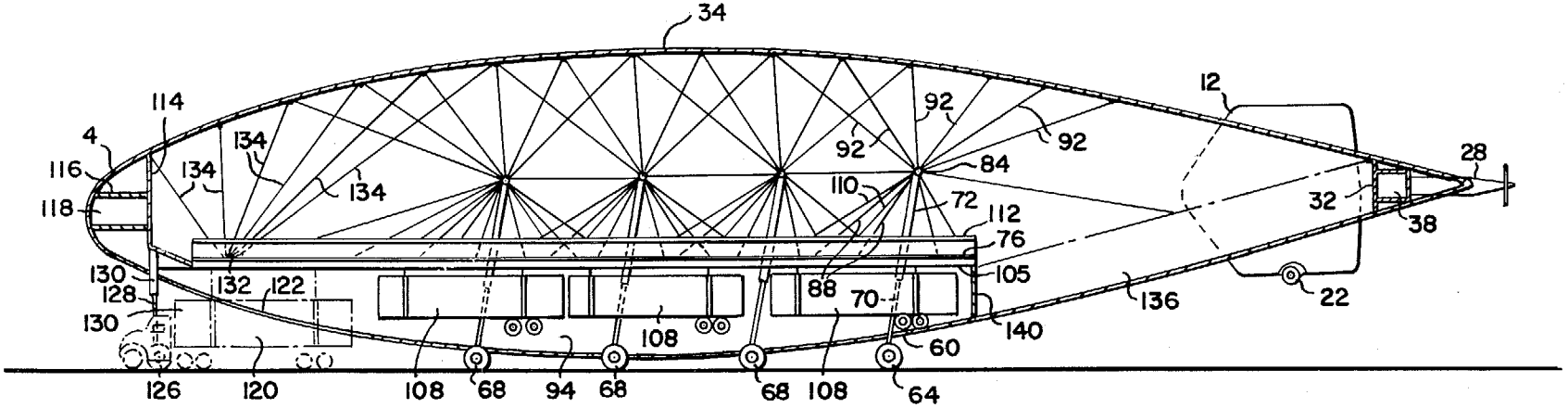
FIGURE 3 is a section taken on the plane indicated at 3—3 in FIGURE 2.
Figure 4:
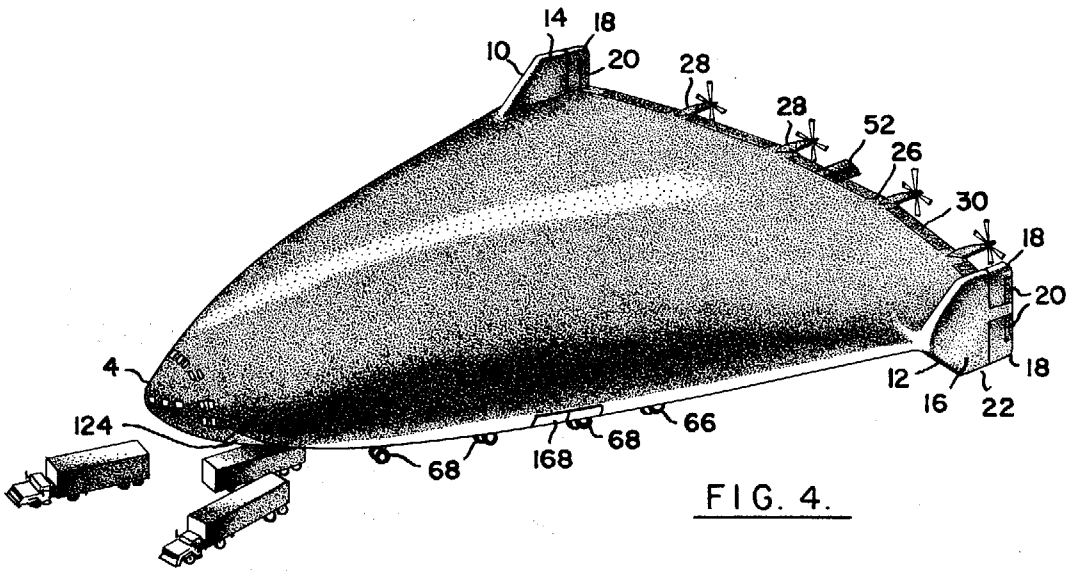
FIGURE 4 is a perspective of the airship in accordance with the invention.

Referring to FIGURE 3, the interior of nose 4 is shown separated from the gas space by bulkhead 114. Decks are provided at 116 and 118, and this space is used as a flight station. Trailer bodies 108 are shown in position in the cargo compartment below cover 76, and a further trailer body 120 is shown in position to be raised by hoists from the ground through opening 122, which is desirably provided with doors, one of which is indicated in FIGURE 4 at 124. A nose wheel 126 is supported by strut 128. Strut 128 may be used additionally for mooring the ship.

Strut 128 is a piston which is slidable in hydraulic cylinder 130 supported on the forward bulkhead 114. A forward suspension point 132 is provided on cover 76, and suspension cables 134 radiate from point 132 to various points on the upper half shell of the hull.

Referring to FIGURES 1 and 3, keel members 136 and 138 extend between bulkheads 32 and 140, and form a Y-keel, which transmits part of the thrust provided by the engines to the various means enclosing the cargo compartment. This is important particularly at low speeds, and during take-off, since the main counteracting forces are the inertia of the concentrated mass in the cargo compartment and the rolling friction of the landing gear. The thrust of the engines is also transmitted through the stern arch to the leading edge beams, and to the internal gas through bulkhead 32. The landing gear masts are inclined backward about 10° from vertical in order to align the resulting force of roling friction and load as well as the landing shock vector with the axes of the masts.

The hull, as shown in longitudinal section in FIGURE 3, has a profile which is substantially symmetrical about the longitudinal axis of the ship, although it may be slightly cambered if desired.

The chord length of the profile (the maximum chord length) is 4.5 times the maximum vertical dimension thus giving the ship a fineness ratio of 4.5, and the position of the maximum vertical dimension is at a distance between 40 and 45% of the chord length from the nose.

The maximum span is at the stern of the ship between the end plates, and is about 75% of the chord length between the nose and the stern. The aspect ratio, that is, the square of the maximum span divided by the planform area, is between 1.0 and 2.0, and desirably about 1.23.

The position of the maximum transverse cross-section is at a distance from the nose of 60% of the chord length from the nose to the stern.

The center of gravity of the ship's volume is located at a distance from the nose equal to about 54% of the maximum chord length.

The center of gravity of the surface of the hull, assuming a development of the surface into a plane, is at a distance from the nose equal to 59% of the maximum chord length.

The center of gravity of the planform, that is, the projection of the ship vertically onto a plane, is at a distance from the nose equal to about 62% of the maximum chord length.

The mean aerodynamic chord length is about 73% of the maximum chord length, and is spaced from the axis of the ship by a distance of about 14% of the maximum chord length.

Figure 5:
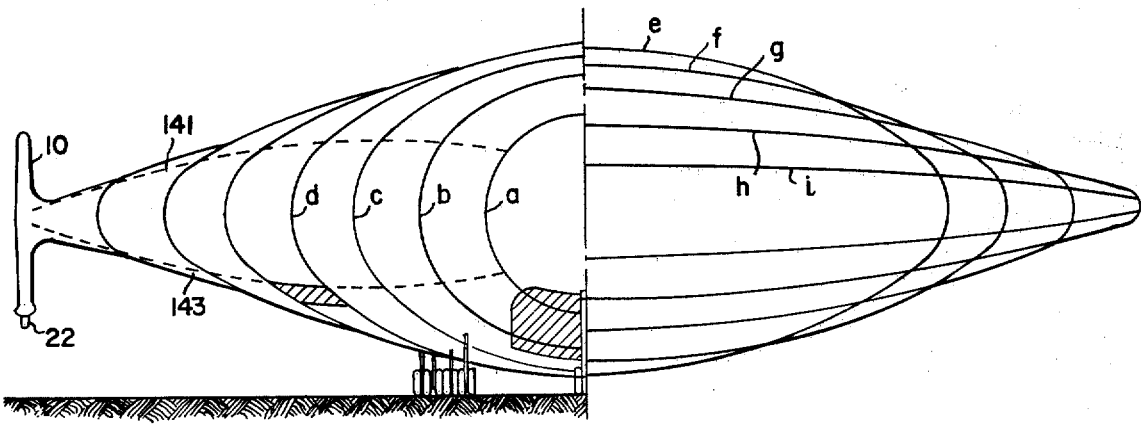
FIGURE 5 is a diagrammatic front elevation of an airship in accordance with the invention, showing the intersections of equally spaced parallel vertical planes with the hull of the airship, the positions of these planes being indicated by station a–i in FIGURE 1.

The gradual flattening of the transverse cross-section of the ship from front to rear is illustrated in FIGURE 5 by ellipse-like curves which represent the intersections between the hull of the ship and a plurality of equally spaced parallel planes perpendicular to the axis of the ship. Nine such intersections are indicated, and are lettered a through i on both of FIGURES 1 and 5. It will be apparent that the front of the ship is approximately circular, while near the rear of the ship, the cross-section is approximately elliptical. The leading edge, indicated between lines 141 and 143 (FIGURES 1, 5 and 9), is conical throughout the rear 64% of the maximum chord length, i.e., from between stations c and d to station h. The forward 36% has a compound curvature.

Figure 9:
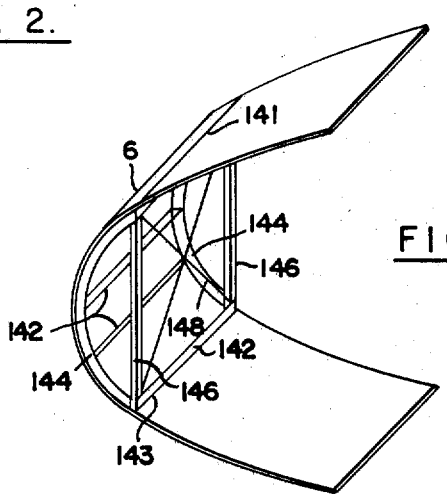
FIGURE 9 is a fragmentary perspective of a portion of the leading edge of the airship showing bracing.

Referring to FIGURE 9, a portion of leading edge 6 is shown having longitudinal stiffeners 142, and ring stiffeners 144. Vertical columns 146 connect the ends of the ring stiffeners, and diagonal cables 148 connect opposite intersections of columns 146 and ring stiffeners 144. The leading edge thus obtains sufficient lateral and tortional rigidity to permit its temporary use as a construction jig during assembly.

Figure 10:
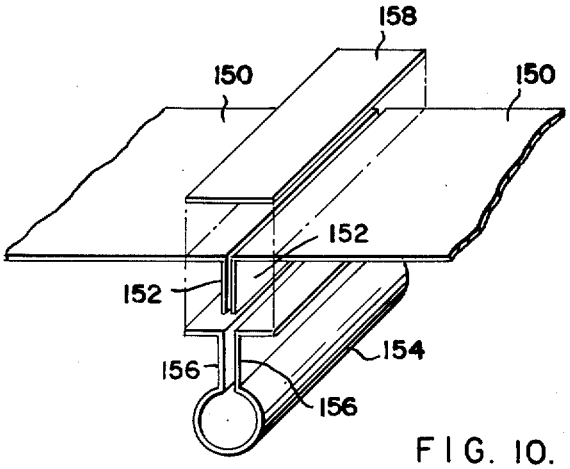
FIGURE 10 is an exploded perspective, showing a pair of hull panels, and illustrating the manner in which they are attached.

The hull of the ship consists of a plurality of metal panels 150, preferably of aluminum, and which are connected to each other, as illustrated in the exploded view in FIGURE 10, by providing abutting perpendicular sections 152. A tubular member 154 is provided with opposing right-angle extensions 156, which engage members 152 and clamp them together. Member 158 is provided along the opening between adjacent panels 150 on the outside of the hull, and members 158 and 154 are desirably secured to the hull members 150 by adhesive bonding.

When a plurality of panels 150 are fastened together by members 154, a rigid framework is built up, which transfers a pressure load on the metal skin of the ship to the nearest attachment point of the suspension cables. These attachment points are illustrated in FIGURE 6 at 160 at the intersection between members 154 and similar members 162, which extend at right angles to members 154.

Returning to FIGURE 1, fuel compartments are provided at 164 on either side of the cargo compartment. Rails 166, which are similar to the rails in the cargo compartment are provided, and hoists (not shown) are provided within the fuel compartments in order to raise fuel containers through an opening closed by doors 168 (FIGURE 4). The fuel tank hoisted into a compartment 164 may conveniently comprise the entire trailer portion of a tank truck. Suitable connections can be made between these fuel tanks and the turbo-prop engines.

Figure 6:
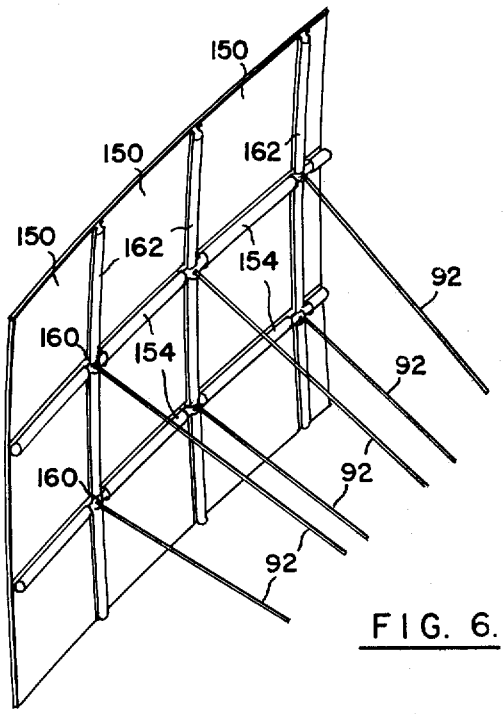
FIGURE 6 is a fragmentary perspective of the interior of the hull of the airship showing the stiffener framework, and suspension cables connected at intersections of the framework members.

The outer skin of the aircraft is desirably formed of aluminum panels, arranged and fastened together as illustrated in FIGURES 6 and 10 to form a gas-tight helium container. The skin of the upper half shell is supported partially by the framework comprising members 162 and 154, and partially by gas pressure. The lower half of the shell is supported by the framework, which is suspended by cables radiating from suspension points to points at the intersections of members 154 and 162.

The upper and lower half shells desirably have a practically constant curvature over most of any transverse cross-section of the airship. The curvature of the leading edges, of course, is different. Because of the constant curvature of the shells, it is possible to build up each hull section from identical panels 150 athwartship.

The metal skin bulges out slightly under the gas pressure, transferring the load on the area of each panel to the framework intersections which transfer the load through the suspension cables to the suspension points. The suspension cables lead to the upper and lower half shells, and maintain the ellipse-like shape of the hull cross-section. Because the hull is pressurized, the skin is held in tension, and there is no need for heavy structural elements to support the hull against collapse.

The stern arch 24, as shown in FIGURE 1, constitutes the trailing edge of the airship, and connects the tips of the conical leading edge sections at both end plates. Since the stern arch is polygonal, with an engine nacelle mounted at each corner, the stern arch is subjected to a wedging effect through propeller thrust. The stern arch functions as a load distributing beam for the four localized thrust vectors. The area of bulkhead is such that, under normal cruising conditions, the pressurization of the hull suffices to balance the total thrust. When the ship is under acceleration, however, the thrust is directly transferred through the Y-keel into the shell and framework of the cargo compartment, and it is also transferred to the leading edges. At increasing speeds, aerodynamic drag gradually replaces rolling friction, and a portion of the thrust is transferred, both from the cargo compartment and from the leading edges, through the suspension cables to the envelope.

Since the propulsion system is arranged along the stern arch, the drag and thrust systems are effectively in tandem, and are not independent as would be the case in a side-by-side arrangement. The momentum loss of flow due to the deceleration of the drag system is compensated by the accelerating action of the propulsion system, thus restoring the original velocity of the fluid. A large saving of power results over that which would be required to propel a similar airship, if the propulsion system and drag system were arranged side-by-side. The convexity of the stern permits an aerodynamically favorable air flow.

The main landing gear consisting of eight multiple wheel units, shown in FIGURE 1 as units 64, 66 and units 68. These wheel units are arranged along both sides of the cargo compartment for efficient load transfer. The wheel units are arranged successively farther apart toward the rear of the ship for lateral stability.

The hydraulic actuating system for the landing gear masts permits attitude control of the ship's main axis while on the ground, and retraction of the landing gear while the ship is in flight. While the ship is stationary on the ground, the landing gear, including the nose wheel are selectively adjusted so that the ship is tilted forward. During take-off, however, the nose of the ship may similarly be adjusted to the desired angle of attack by extension of forward and nose landing gear and retraction of the rearward landing gear.

The hydraulic system controlling the landing gear is desirably a hydro-pneumatic system, in which a hydraulic fluid fills the cylinders on the landing gear masts. The spaces within the cylinders communicate with individual chambers containing a pneumatic fluid which permits long-travel shock absorption in the landing gear. Control of the position of the individual landing gear is accomplished by introduction of hydraulic fluid into the mast cylinders. Further absorption of landing shock is accomplished by transfer through the suspension cables to the hull.

Wheels 22 suspended from the stabilizer fins protect the stabilizers and propellers at high angles of attack, especially during take-off. The nose landing gear prevents the ship from toppling due to intertial forces. The nose landing gear, furthermore, provides a tie-down point for ground mooring, and permits the ship to weathervane in strong winds. Since the pivot point is in the region of the loading door, moderate weathervaning in gusty winds should not impede loading and unloading operations.

Conventional ballonets may be provided within the gas space, and may be filled through conventional air scoops. These ballonets can be distributed about the interior of the hull wherever absence of cable rigging permits, and permit displacement of helium within the gas space by air in order to control pressurization and to control aerostatic lift.

The aerostatic lift of the helium constitutes, a substantial economic advantage, particularly in very large ships. It may, however, constitute a problem when the ship is being unloaded since it may become too light for safe ground operation. Therefore, proper care must be taken to keep the ship partly ballasted by fuel or cargo or both particularly where local wind conditions are severe.

The rails in the cargo and fuel compartments are suspended by cables from the various suspension points at the upper ends of the landing gear masts. The cargo and fuel compartments are therefore effectively suspended from the masts while the ship is on the ground, while they are suspended from the upper half shell while the ship is in flight. Since the cargo is suspended from the suspension points, rather than by the floor of the cargo compartment, high specific floor loads and the resulting necessity for reinforcement are avoided. Furthermore, it is not necessary to transfer the floor load upward by additional beam structures and columns which would obstruct the cargo space. By the use of the cargo suspension system, a great reduction of weight is realized.

The separate lateral doors opening to the fuel compartments permit the hoisting of fuel containers independently of cargo handling operations.

While it is contemplated that only one door 124 should be provided leading to the cargo compartment, in an alternative construction, a plurality of doors could be provided, opening to various points in the cargo compartment in order to permit ready access to any item of cargo.

The various structural elements of the cargo compartment receive the thrust through the Y-keel members 136 and 138, and transmit the thrust, in turn, through the suspension cables to the hull.

Loading and unloading of cargo is accomplished through door 124, the various hoists 104 being used to raise cargo containers through the door, and to carry them toward the rear of the cargo space. Because two cargo supporting tracks are provided, it is possible to maintain a minimum excess weight of the ship by following a procedure comprising the steps of first unloading one track, reloading that track, then unloading and reloading the other track. One track is thereby loaded with cargo at all times.

Because of its excess gross weight, the ship is capable of taxiing in the same fashion as a conventional multiple-engine airplane, using propeller pitch control for turning maneuvers. Provisions for wheel steering may also be made. Downwind taxiing and 180° turns can be avoided by backing up the ship and steering it from the stern taxi control station 52. Such operation is particularly desirable in high winds, in which the nose of the ship should be faced toward the wind in a slightly nose-down attitude.

The ship is capable of taking off and landing on a comparatively short runway. During the engine run-up, the rearward landing gear will be partially retracted, and the forward landing gear extended in order to give the ship a nose-up attitude. With this initial angle of attack, the ship builds up an effective air cushion during the take-off run, which relieves the load from the wheels to a large extent at moderate speeds. This air cushion reduces the rolling friction considerably, and enables the ship to accelerate at a high rate until it reaches its full-load climb-out speed.

In flight, since the ship has a symmetrical profile, the angle of attack necessary to produce lift is provided by elevator trim.

During the landing procedure, the ship is flared out in a slightly nose-up attitude, and the ground effect, cushions the touch-down. During landing, the adjustable landing gear may be controlled in order to orient the ship in a safe nose-down attitude.

Because of the large inertial forces acting on the ship, it is difficult to align the axis of the ship with the runway during landing. However, since the landing gear are permitted to swivel freely about vertical axes, there is no necessity for exact alignment of the ship with the runway.

Although the structural strength of the ship depends, in part, on the pressure of the helium within the hull, it will be apparent that, in ships of smaller size having the same general construction, air pressurization could be used with advantage although cargo-carrying capacity would be somewhat reduced.

It will be apparent that extremely large ships, having lengths of the order of 1000 feet, can be constructed in accordance with the invention, and that such ships will have very large pay load and range capabilities so that large payloads, ranging up to 1000 tons or more, can be transported over great distances economically. Transportation economy will be further enhanced by the short-turn-around time capabilities of ships in accordance with the invention.

The choice of a deltoid planform places the aerodynamic center approximately amidships, thus permitting aerodynamic stability by trimming the ship in such a manner that the effective center of gravity is located in front of the aerodynamic center. This is facilitated by the fact that the center of buoyancy is also located in the midship area.

We claim:

1. An airship comprising a hull having a delta planform, said hull including an internal gas space, a cargo compartment within said hull, means separating said cargo compartment from said gas space, means for suspending cargo within said cargo compartment, and means suspending said means suspending said cargo from said hull wherein said means suspending said means suspending said cargo from said hull includes a plurality of suspension points, cables radiating from each of said suspension points to points on the inner surface of said hull, and cables radiating from each of said suspension points to points on said means suspending said cargo and including landing gear masts attached to and extending downwardly from at least two of said suspension points.

2. An airship according to claim 1 in which each of said landing gear masts comprises cylinder means attached to at least one of said suspension points, and piston means extending into an opening in each of said cylinder means and supporting landing gear, and including means defining a space within said hull for landing gear, means sealing said landing gear space from said gas space, and controllable means controlling the position of said piston means with respect to said cylinder means.

3. An airship comprising an enclosed hull filled at least in part by a gas lighter than air, said hull being substantially in the form of a delta wing having ellipse-like transverse cross-sections throughout its length, an aspect ratio between 1 and 2, a fineness ratio of approximately 1 to 4.5 and having its maximum vertical dimension at a distance between 40 and 45 percent of its chord length from its nose, wherein the trailing edge comprises a plurality of substantially straight line segments, each of said segments meeting the next adjacent segment at an angle less than 180° to provide a convex trailing edge, and including a plurality of means for propelling said hull, each said propelling means being positioned at the intersection of an adjacent pair of said segments.

4. An airship comprising a hull having a deltoid shape derived by lateral expansion of a drop-shaped streamline body in such a manner that its planform is substantially delta-shaped, the maximum lateral dimension of the hull being less than the maximum longitudinal dimension, said hull including an internal gas space, a cargo compartment within said hull, means separating said cargo compartment from said gas space, means for suspending cargo within said cargo compartment, and means suspending said means for suspending said cargo from said hull in which said means for suspending cargo includes rail means extending along the upper part of said cargo compartment and hoist means movable along said rail means for raising cargo into and lowering cargo from said cargo compartment and for positioning and holding cargo suspended during flight, and in which said means for suspending said means for suspending said cargo from said hull includes cables connecting said rail means to said hull.

5. An airship according to claim 4 including propulsion means located at the stern, and means capable of sustaining compressive forces connecting said propulsion means to said rail means, and in which a plurality of said cables are arranged to transmit propulsion forces from said rail means to said hull.

6. An airship according to claim 5 in which said rail means extend longitudinally within said hull, and in which said means capable of sustaining compressive forces comprises at least two beams, each of said beams having an end connected to the rear end of said rail means and having its opposite end connected to a point on the stern of said hull, the point on the stern of said hull to which one of said beams is connected being separated by a distance from the point to which another of said beams is connected.

*7. An aircraft with combined aerodynamic and aerostatic lift comprising an enclosed hull, the major volume of which is filled with a lighter-than-air gas, said hull being characterized by a delta-shaped planform substantially symmetrical about a plane extending from a narrow nose at one corner of the planform to the mid-point at the wide end of the planform opposite the nose, ellipse-like cross-sections transverse to said plane throughout substantially all of its length, a maximum height dimension in said plane perpendicular to the chord in said plane at a point spaced from said wide end and spaced from the nose, said ellipse-like cross-sections progressively increasing in width measured perpendicularly to said plane and progressively decreasing in height, measured in said plane, throughout substantially the entire distance from the cross-section at the point of maximum height toward said wide end.*

*8. An aircraft according to claim 7, in which said ellipse-like cross-sections progressively increase in width and increase in height, throughout substantially the entire distance from the nose toward the cross-section at the point of maximum height.*

References Cited

The following references, cited by the Examiner, are of record in the patented file of this patent or the original patent.

UNITED STATES PATENTS

| | | | |
|---|---|---|---|
| 2,778,585 | 1/1957 | Tschudy | 244—30 |
| 2,967,034 | 1/1961 | Eyre | 244—36 |
| 1,763,835 | 6/1930 | Upson | 244—126 X |
| 1,826,076 | 10/1931 | James | 244—25 |
| 1,844,765 | 2/1932 | Jackson | 244—25 X |
| 1,981,856 | 11/1934 | Downey | 244—102 |
| 2,073,297 | 3/1957 | Dürr | 244—125 |
| 2,529,908 | 11/1950 | Bortner | 244—137 |
| 3,270,895 | 9/1966 | Stewart | 212—71 |
| 3,521,836 | 7/1970 | Struble | 244—33 |
| 2,252,342 | 8/1941 | Finley | 244—5 |
| 1,853,653 | 4/1932 | Babula | 244—5 |
| 3,032,298 | 5/1962 | Callahan | 244—5 UX |
| 3,443,776 | 5/1969 | Moore | 244—5 |

TRYGVE M. BLIX, Primary Examiner

G. L. BAREFOOT, Assistant Examiner

U.S. Cl. X.R.

244—125, 127, 137